United States Patent
Hess

(10) Patent No.: US 7,352,110 B2
(45) Date of Patent: Apr. 1, 2008

(54) TOOL HEAD COMPRISING PIEZOELECTRIC ACTUATORS

(76) Inventor: Peter Hess, Staldenweg 1, 6313 Menzingen ZG (CH)

( * ) Notice: Subject to any disclaimer, the term of this patent is extended or adjusted under 35 U.S.C. 154(b) by 263 days.

(21) Appl. No.: 10/563,413

(22) PCT Filed: Jul. 1, 2004

(86) PCT No.: PCT/EP2004/051330

§ 371 (c)(1), (2), (4) Date: Jan. 3, 2006

(87) PCT Pub. No.: WO2005/002784

PCT Pub. Date: Jan. 13, 2005

(65) Prior Publication Data

US 2006/0138897 A1  Jun. 29, 2006

(30) Foreign Application Priority Data

Jul. 4, 2003  (EP) .................................. 03102025

(51) Int. Cl.
H01L 41/08 (2006.01)
(52) U.S. Cl. ...................................... 310/328; 409/235
(58) Field of Classification Search ........ 310/330–332, 310/328
See application file for complete search history.

(56) References Cited

U.S. PATENT DOCUMENTS

| | | | |
|---|---|---|---|
| 4,613,782 A | 9/1986 | Mori et al. | |
| 4,646,595 A | 3/1987 | Slee | |
| 4,686,440 A * | 8/1987 | Hatamura et al. | 318/646 |
| 4,775,815 A * | 10/1988 | Heinz | 310/328 |
| 5,174,695 A | 12/1992 | Bathen et al. | |
| 5,223,713 A | 6/1993 | Uozumi et al. | |
| 5,903,085 A | 5/1999 | Karam | |
| 5,994,820 A | 11/1999 | Kleindiek | |

(Continued)

FOREIGN PATENT DOCUMENTS

CH  671 187  8/1989

(Continued)

OTHER PUBLICATIONS

Kurosawa et al., "Transducer for High Speed and Large Thrust Ultrasonic Linear Motor Using Two Sandwich-Type Vibrators," IEEE Transactions on Ultrasonics, Ferroelectronics and Frequency Control, vol. 45, No. 5, pp. 1188-1195, Sep. 1998.

(Continued)

*Primary Examiner*—Mark Budd
(74) *Attorney, Agent, or Firm*—Thelen Reid Brown Raysman & Steiner LLP; David B. Ritchie

(57) ABSTRACT

A tool head includes a holder for accommodating a tool and two actuators each of which is connected to the holder via a web. On the one hand, the actuators enable the holder to be deflected by a few micrometers from a resting position and, on the other hand, enable ultrasound to be applied to the holder. For this purpose, the actuators contain a piezoelectric drive. Depending on the application, the tool head can be mounted on a conventional machine tool. The tool head is suitable for many applications, in particular for the production of micro-mechanical structures in the surface of a workpiece.

10 Claims, 2 Drawing Sheets

U.S. PATENT DOCUMENTS

| | | |
|---|---|---|
| 6,617,761 B2 * | 9/2003 | Ando et al. .............. 310/328 |
| 2001/0020808 A1 | 9/2001 | Suzuki et al. |
| 2002/0005679 A1 | 1/2002 | Elings et al. |
| 2002/0038988 A1 | 4/2002 | Matsuo et al. |
| 2002/0166398 A1 | 11/2002 | Klocke |
| 2004/0086351 A1 | 5/2004 | Kim et al. |

FOREIGN PATENT DOCUMENTS

| | | |
|---|---|---|
| DE | 2 238 407 | 2/1974 |
| DE | 38 20 085 | 7/1989 |
| DE | 199 24 823 | 11/2000 |
| DE | 100 55 113 | 5/2002 |
| EP | 0 297 574 | 1/1989 |
| EP | 0 440 578 | 8/1991 |
| EP | 1 241 714 | 9/2002 |
| JP | 61-168025 | 7/1986 |
| JP | 2-224904 | 9/1990 |
| JP | 10-76411 | 3/1998 |
| JP | 2002-103101 | 9/2002 |
| SU | 1371864 | 2/1988 |

OTHER PUBLICATIONS

English Translation of the International Preliminary Report on Patentability for International Application No. PCT/EP2004/051330, date of mailing May 29, 2006.

* cited by examiner

TOOL HEAD COMPRISING PIEZOELECTRIC ACTUATORS

CROSS REFERENCE TO RELATED APPLICATIONS

The present application is related to and claims priority of the PCT application number PCT/EP2004/051330 entitled Tool head comprising piezoelectric actuators, filed Jul. 1, 2004, the disclosure of which is herein incorporated by reference, which in turn claims priority of the European patent application number 03102025.8 filed Jul. 4, 2003.

TECHNICAL FIELD

The invention concerns a tool head comprising piezoelectric actuators.

BACKGROUND OF THE INVENTION

In the fields of microsystem technology or nanotechnology as well as in precision mechanics or semiconductor assembly technology, various problems are posed such as the production of a surface with micro-mechanical structures, the finishing, grinding or polishing of a surface already partially produced, and the like. Here, conventional milling machines are at their technological limits because, even at high revolutions, the tip of the milling head removing the material is hardly able to remove any more material as a result of its tiny diameter.

BRIEF DESCRIPTION OF THE INVENTION

Instead of a milling head with a rotating tip for the processing of a surface, the invention suggests the use of a tool head with a tool to which ultrasound can be applied. The tool head in accordance with the invention comprises a holder for accommodating the tool and two actuators that are each connected to the holder by means of a web. On the one hand, the actuators enable deflection of the holder by a few micrometers out of a resting position and, on the other hand the application of ultrasound to the holder. For this purpose, each actuator contains a piezoelectric drive to which, on the one hand a direct voltage can be applied in order to deflect the holder in the direction of the web and, on the other hand an alternating voltage signal, i.e., an alternating voltage or an alternating current, can be applied in order to vibrate the holder in oscillations aligned along the web.

The tool head is preferably mounted on a conventional machine tool that enables a rough positioning of the tool in three Cartesian coordinate directions in relation to the surface of the workpiece to be processed. The fine positioning of the tool takes place in that direct voltages that correspond to the position to be taken up are applied to the actuators of the tool head. For the processing of the surface of the workpiece, an alternating voltage signal is now applied to each of the actuators of the tool head so that the tip of the tool vibrates. The relationship of the amplitudes of the two alternating voltage signals determines the direction of oscillation of the tool relative to the axes of the two actuators.

There are now applications with which a fine positioning and/or ultrasonic vibration of the tool in the third Cartesian coordinate direction is also necessary. For such applications, the tool head has a third piezoelectric drive to which a direct voltage and an alternating voltage signal can also be applied.

BRIEF DESCRIPTION OF THE DRAWINGS

In the following, embodiments of the invention are described in more detail based on the drawing figures. The figures are not drawn to scale.

DETAILED DESCRIPTION OF THE INVENTION

Figure 1:
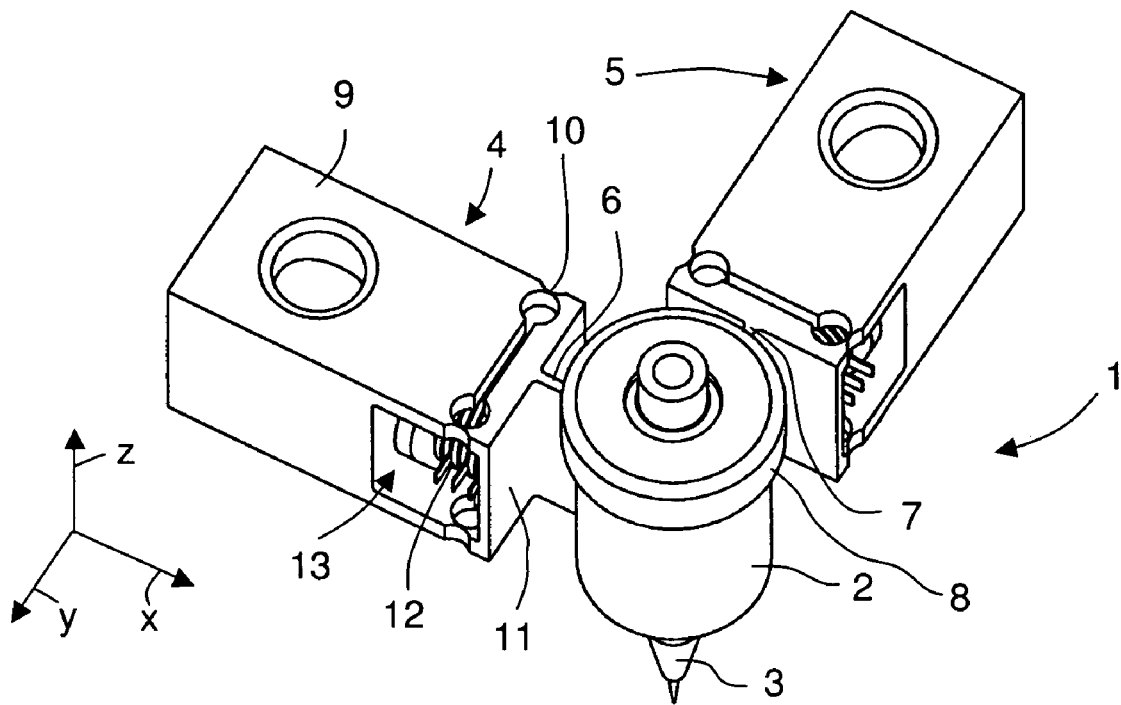
FIG. 1 shows a tool head in accordance with the invention.

FIG. 1 shows in perspective view of a tool head 1 in accordance with the invention. The axes of a Cartesian system of coordinates are designated x, y and z. The tool head consists of a holder 2 for accommodating a tool 3 and of two actuators 4 and 5 that are each connected to the holder 2 via a web 6 and 7. The two actuators 4 and 5 are secured to a not presented plate that is adjustable in the z direction. The two webs 6 and 7 (and therefore also the two actuators 4 and 5) are preferably arranged orhtogonally to each other. The first actuator 4 enables movements and ultrasonic oscillations of the tool 3 in the x direction, the second actuator 5 enables movements and ultrasonic oscillations of the tool 3 in the y direction. The two actuators 4 and 5 are constructed identically and therefore in the following only the first actuator 4 is described in more detail. In the example, the holder 2 comprises collet chucks that can be opened and closed by means of a nut 8 and into which the tool 3 is clamped.

The actuator 4 consists of a body 9 and a front plate 11 connected to the body 9 by means of four webs 10 (in the figure, only three webs 10 are visible), as well as a piezoelectric drive 12 consisting of piezoelectric elements. The four webs 10 form a solid joint that connects the front plate 11 to the body 9. The web 6 that connects the front plate 11 and the holder 2 projects from the front plate 11. The web 6 and the four webs 10 run parallel to each other, namely in the x direction. The piezoelectric drive 12 is clamped between the front plate 11 and the body 9. When a direct voltage is applied to the piezoelectric drive 12, then the front plate 11 moves relative to the body 9 in the x direction. When an alternating voltage signal, i.e., an alternating voltage or an alternating current is applied to the piezoelectric drive 12, then the front plate 11 oscillates back and forth relative to the body 9 in the x direction. On the one hand, the web 6 is a leaf spring that enables deflection of the holder 2 orthogonally to the longitudinal direction of the web 6 and, on the other hand it is an amplifier for the ultrasonic oscillations.

Securing of the piezoelectric drive 12 in the actuator 4 is done via a coupling mechanism 13 in order to avoid tilting of the piezoelectric drive 12 on installation as well as during operation.

Figure 2:
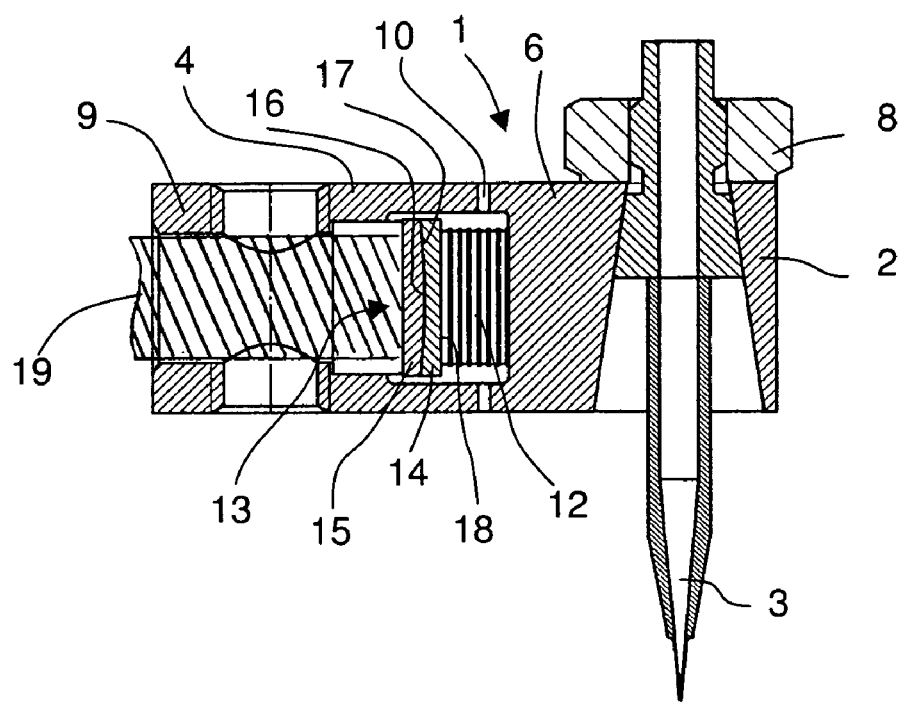
FIG. 2 shows a cross-sectional drawing of the tool head.

FIG. 2 shows a cross-sectional drawing of the tool head 1 whereby the section runs through the web 6 and shows the construction of the actuator 4. The coupling mechanism 13 comprises two bodies 14 and 15 resting against each other, the surfaces 16 and 17 of which facing each other are spherical seats. A surface 18 of the body 14 lying opposite the surface 17 is a flat surface that, thanks to the coupling mechanism 13, is essentially aligned parallel to the front plate 11. The body 9 contains a thread running in the x direction into which a screw 19 is screwed that presses with one end against the body 15 of the coupling mechanism 13 so that the piezoelectric drive 12 is clamped between the front plate 11 and the body 14. The two spherical seats present a bearing element and ensure that the surface 18 rests evenly on the surface of the piezoelectric drive 12 lying opposite it, independently of the force or the torque exerted by the screw 19 on the coupling mechanism 13. On assembly of the actuator 4, the body 14 is secured by means of a tool so that it does not turn as a result of the torque exerted by the screw when tightening. In order that the screw 19 does not loosen during operation, it is either glued to the body 9 or secured with a lock nut.

The coupling mechanism 13 can also be achieved in another way. In principle, it suffices when the bodies 14 and 15 only come into contact along a line or cylindrical surface running parallel to the z-axis. When the contacting surfaces 16 and 17 of the bodies 14 and 15 are spherical or cylindrical, than the risk of flattening as the result of the ultrasonic oscillations that occur during operation is much less than with a contact along a line.

In operation, a direct voltage, an alternating voltage signal or a combination of direct voltage and alternating voltage signal is applied to the piezoelectric drive of the actuator 4. A direct voltage causes a movement of the front plate 11 along the x-axis relative to the body 9. An alternating voltage signal causes the front plate 11 to oscillate in the x direction relative to the body 9. The frequency of the alternating voltage signal lies in the ultrasonic range. When a direct voltage is superimposed on the alternating voltage signal, then the direct voltage causes a shifting of the zero point of the oscillations. The direct voltages and the alternating voltage signals for application to the actuators 4 and 5 are produced by a control device 30. The control device 30 is programmed and controls the removal of material from the surface of the workpiece. The removal of the material is preferably monitored by means of suitable sensors 31 whereby the control device 30 also evaluates the data delivered by the sensors 31.

The movements of the front plate 11 of the first actuator 4 are transmitted to the holder 2 via the web 6 functioning as a leaf spring. Likewise, the movements of the front plate of the second actuator 5 are transmitted to the holder 2 via the web 7 also functioning as a leaf spring. In doing so, the webs 6 and 7 bend and the holder 2 is deflected from its resting position. The length of the webs 6 and 7 as well as the geometry of the web 10 are selected so that in operation the webs enable deflections of a few micrometers without leaving the range of elastic deformation.

The tool head 1 can be used for numerous applications whereby a tool 3 adapted for the application is inserted into the holder 2. The tool head can be attached to the head of any machine tool whereby the head of the machine tool is moveable in the three directions x, y and z of a Cartesian system of coordinates or in three spatial directions of any other system of coordinates and, under certain circumstances, also has other degrees of freedom. The machine tool behaves like a robot that moves the tool head in accordance with the invention in space so that with the tool head different work can be carried out that requires an accuracy that exceeds the positioning accuracy of the machine tool. For many applications it is necessary that the positioning accuracy of the tool head in the z direction is also greater than that of the machine tool. For these applications, the tool head in accordance with the invention can be equipped with a piezoelectric drive for the z direction.

Figure 3:
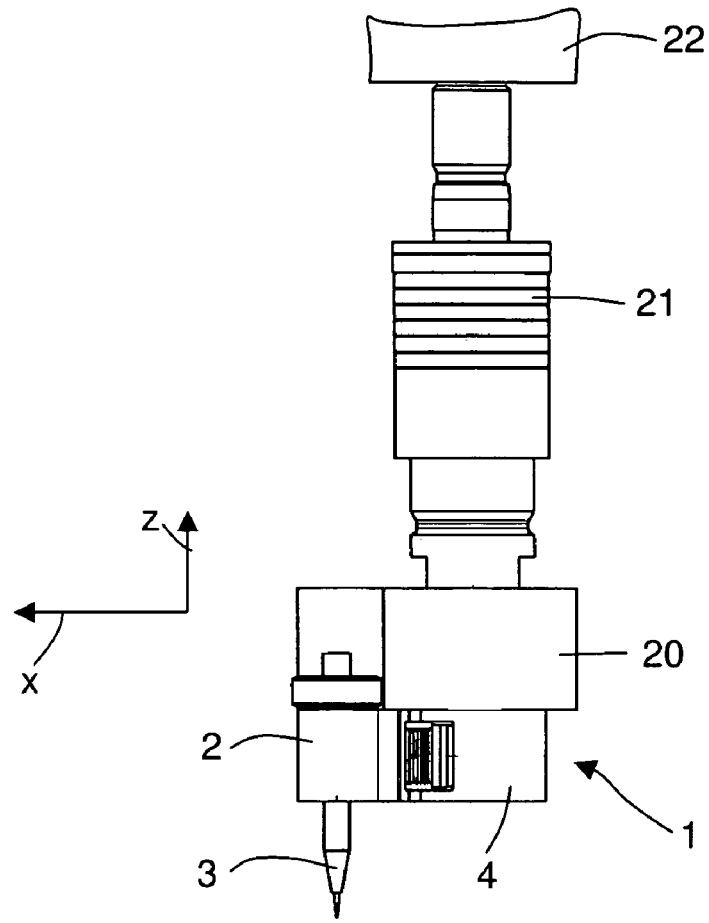
FIG. 3 shows a further tool head.

FIG. 3 shows a side view of such a tool head 1. The actuators 4 and 5 of the tool head 1 are attached to a plate 20 aligned parallel to the xy plane. The plate 20 is attached to the machine tool 22 via a piezoelectric drive 21. The piezoelectric drive 21 enables the positioning of the tool head 1 in a direction running orthogonally to the plate 20, here in the z direction, with an accuracy that lies in the sub-micrometer range. As with the piezoelectric drive 12 of actuators 4 and 5, the piezoelectric drive 21 is clamped pretensioned between two plates that are distanced by means of an elastic deformable body. Such a body includes, for example, several ring-shaped plates that are connected by means of narrow webs. The plates and the webs are however not individual parts but manufactured from one piece. The pretensioned body works as a spring so that the piezoelectric drive 21 can deflect the plate 20 in the positive as well as in the negative z direction. In this case, the control device 30 produces direct voltages and alternating voltage signals for application to the actuators 4 and 5 as well as the piezoelectric drive 21.

Figure 4:
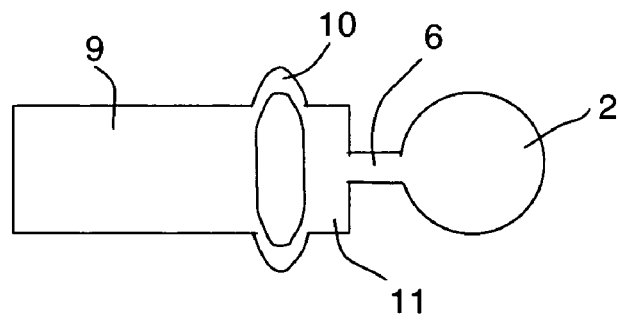
FIG. 4 shows a plan view of an actuator of the tool head.

FIG. 4 shows a plan view of the body 9 and the front plate 11 of the actuator 4. In this example, the webs 10 that connect the front plate 11 and the body 9 are designed differently to those with the first example. The webs 10 are U-shaped.

The tool head 1, i.e., the body 9, the webs 10 and the front plate 11 of both actuators 4, 5 as well as the webs 6 and 7 and the holder 2, is preferably manufactured from one piece of material. However, the tool head 1 can also be assembled from individual parts that are, for example, glued or soldered together.

In the following, examples of applications for the tool head 1 in accordance with the invention are described in more detail. The list of applications is not complete.

EXAMPLE 1

With this example, the tool head 1 is used for the production of micro-mechanical structures in the surface of a workpiece. The tool head 1 of the embodiment in accordance with the example in FIG. 3 is attached to a machine tool. In accordance with this embodiment, the tool 3, a pin or a capillary, generally designated in the following as a capillary, is inserted into the holder 2. The machine tool places the capillary over the workpiece. An alternating voltage is applied to each of the two actuators 4 and 5 so that the tip of the tool oscillates in the ultrasonic range. Comparatively slowly changing direct voltages are superimposed on the alternating voltages in order to guide the capillary over the workpiece to be processed whereby removal of material from the workpiece takes place. The depth of the micro-mechanical structure developed in the workpiece is controlled via the piezoelectric drive 21 whereby a force sensor or an optical distance sensor, for example, is used to determine and control the z position of the capillary. Such measurement and control circuits as well as the production of structures in a surface are generally known for which reason further explanations are dispensed with. However, this example differentiates itself from prior art in that the tool head in accordance with the invention enables the production of micro-mechanical structures the dimensions of which are much smaller and lie in the micrometer or sub-micrometer range. An important advantage exists in that, in contrast to a milling machine, the oscillating tip of the tool includes no position at which the speed of the tip is zero.

EXAMPLE 2

Figure 5:
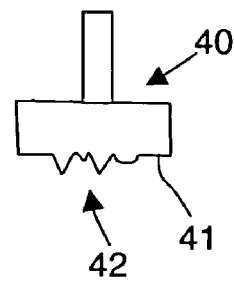
FIG. 5 shows a side view of a stamp with micro-mechanical structures.

A workpiece produced, for example, in accordance with Example 1 may itself be used as a tool, i.e., as a stamp that is inserted into the holder 2. Such a stamp 40 is shown in FIG. 5. A surface 41 of the stamp 40 has micro-mechanical structures 42. This surface 41 is pressed against a workpiece to be processed. Alternating voltage signals are again applied to the two actuators 4 and 5 and optionally also the piezoelectric drive 21 so that the surface 41 of the stamp 40 oscillates. The micro-mechanical structures 42 of the stamp 40 oscillating with ultrasonic frequency lead to micro-mechanical structures also being produced in the workpiece.

EXAMPLE 3

The tool head 1 in accordance with the invention is also suitable for the finishing of micro-mechanical structures, in particular for the polishing or regrinding of optical surfaces. For example, it is possible to roughly produce a micro-mechanical structure with conventional means, be it with mechanical or chemical processing, and to finish the pre-formed surface by means of the tool head 1 in accordance with the invention.

With these three examples, the grinding of the surface of the workpiece is preferably accomplished by means of an abrasive as is also customary in prior art. When a capillary with a longitudinal drill hole is used as the tool, then the abrasive can be supplied through the longitudinal drill hole of the capillary. Alternatively, instead of the abrasive or in addition to the abrasive, an etchant can be supplied through the longitudinal drill hole of the capillary. This enables selective etching of the surface of the workpiece.

What is claimed is:

1. A tool head, comprising:
   a holder for accommodating a tool,
   a plate, and
   two actuators, each of said two actuators including:
      a body attached to said plate,
      a front plate having a first web projecting from the front plate and connecting the front plate to the holder,
      second webs connecting the front plate to the body, and
      a first piezoelectric drive, said first piezoelectric drive clamped in a cavity formed between the front plate and the body,
   wherein an alternating voltage signal applied to said first piezoelectric drive causes said front plate to oscillate relative to said body with oscillations aligned in a longitudinal direction of said second webs, and
   wherein a direct voltage applied to said first piezoelectric drive causes said front plate to move relative to said body in the longitudinal direction of said second webs.

2. A tool head according to claim 1, further comprising:
   a second piezoelectric drive, wherein said second piezoelectric drive is attached to said plate on a side thereof opposite a side facing said two actuators.

3. A method for using a tool head, the tool head including:
   a holder for accommodating a tool,
   a plate, and
   two actuators, each of said two actuators including:
      a body attached to said plate,
      a front plate having a first web projecting from the front plate and connecting the front plate to the holder,
      second webs connecting the front plate to the body, and
      a first piezoelectric drive, said first piezoelectric drive clamped in a cavity formed between the front plate and the body,
   the method comprising:
      applying an alternating voltage signal to the first piezoelectric drive to cause the front plate to oscillate relative to the body with oscillations aligned in a longitudinal direction of the second webs, and
      applying a direct voltage to the first piezoelectric drive to cause the front plate to move relative to the body in the longitudinal direction of the second webs.

4. A method for using a tool head, the tool head including:
   a holder for accommodating a tool,
   a plate, and
   two actuators, each of said two actuators including:
      a body attached to said plate,
      a front plate having a first web projecting from the front plate and connecting the front plate to the holder,
      second webs connecting the front plate to the body,
      a first piezoelectric drive, the first piezoelectric drive clamped in a cavity formed between the front plate and the body, and
      a second piezoelectric drive, the second piezoelectric drive attached to the plate on a side thereof opposite a side facing the two actuators,
   the method comprising:
      applying an alternating voltage signal to the first piezoelectric drive to cause the front plate to oscillate relative to the body with oscillations aligned in a longitudinal direction of the second webs, and
      applying a direct voltage to the first piezoelectric drive to cause the front plate to move relative to the body in the longitudinal direction of the second webs.

5. The method of claim 3, further comprising:
   placing a capillary tool into the tool holder.

6. The method of claim 4, further comprising:
   placing a capillary tool into the tool holder.

7. The method of claim 3, further comprising:
   placing a pin into the tool holder.

8. The method of claim 4, further comprising:
   placing a pin into the tool holder.

9. The method of claim 3, further comprising:
   placing a stamp containing a surface with micro-mechanical structures.

10. The method of claim 4, further comprising:
    placing a stamp containing a surface with micro-mechanical structures.

* * * * *